May 5, 1964
E. J. JUNKINS
3,131,747
CLAMP ASSEMBLAGE
Filed June 6, 1960
2 Sheets-Sheet 2
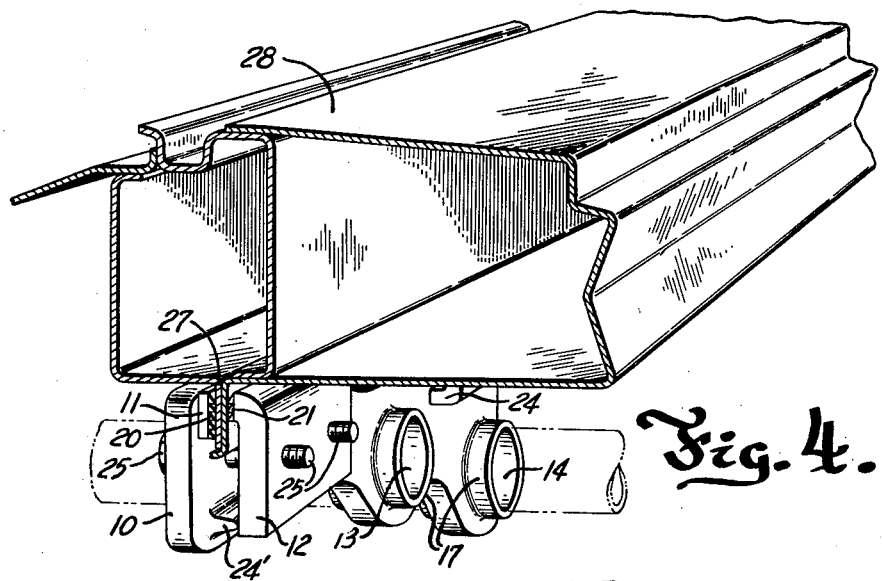
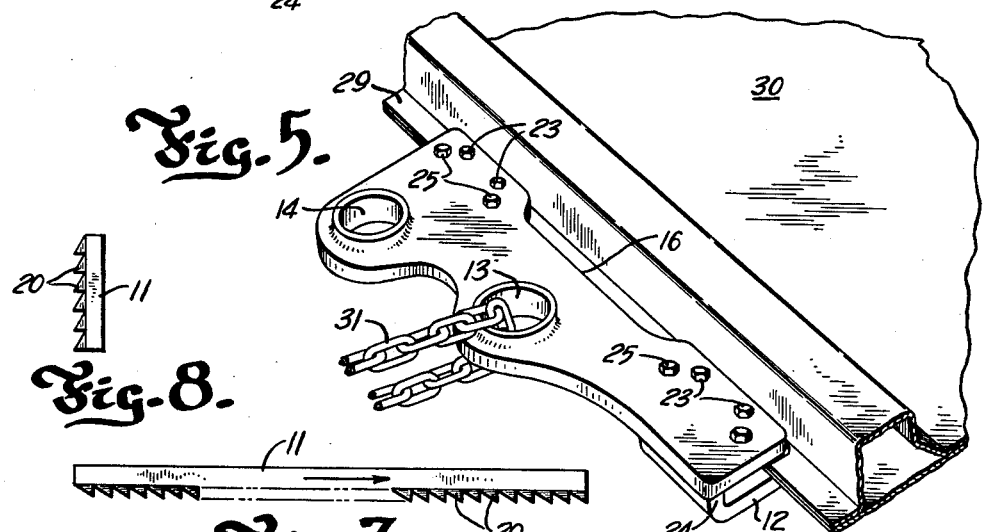
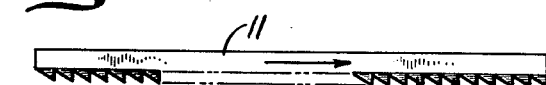
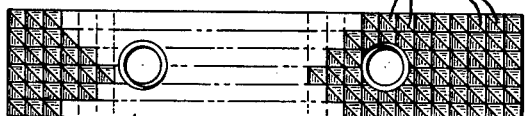
INVENTOR.
E. James Junkins
BY
Lieber, Lieber & Nilles
Attorneys though the invention has been shown and described
United States Patent Office
3,131,747
Patented May 5, 1964

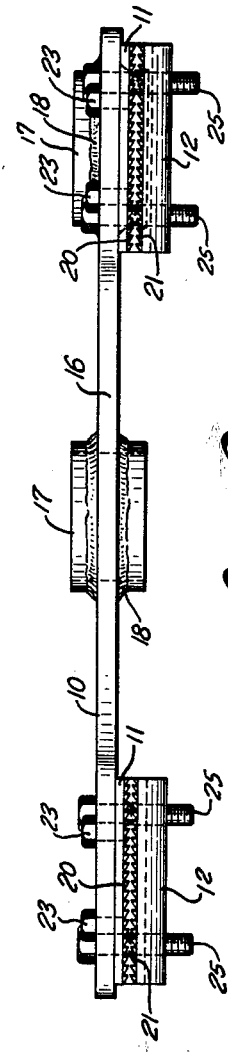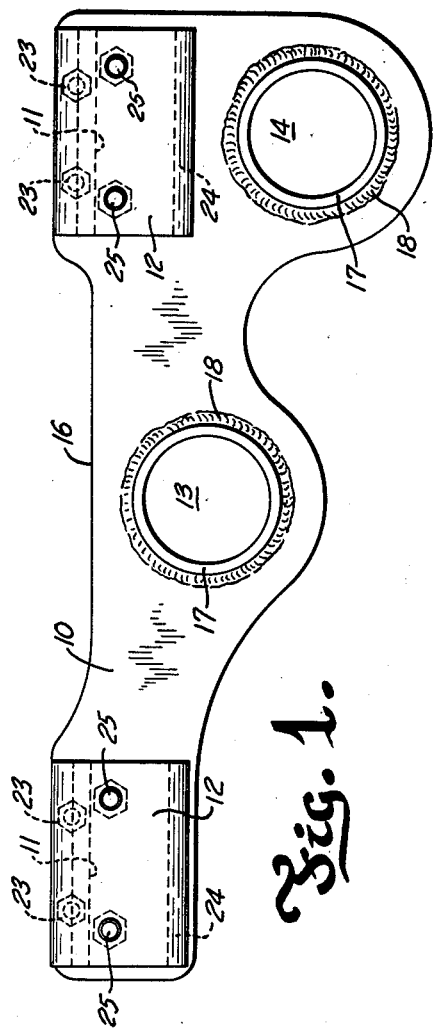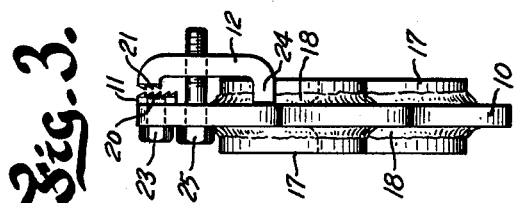

3,131,747
CLAMP ASSEMBLAGE
Edmund James Junkins, West Allis, Wis., assignor to Applied Power Industries, Inc., a corporation of Wisconsin
Filed June 6, 1960, Ser. No. 34,018
5 Claims. (Cl. 153—32)

The present invention relates in general to improvements in the art of holding and manipulating diverse articles while work is being performed thereon, and it relates more specifically to improvements in the construction and operation of clamping structures or assemblages especially adapted to firmly grip and hold articles such as damaged vehicle bodies while they are being repaired.

The primary object of the invention is to provide an improved clamping device which is simple and durable in construction, highly effective in use, and flexible in adaptation.

Many intricate problems are frequently encountered in the restoration of damaged vehicles of various types, and especially in connection with the repair of automobiles and trucks having so-called "unitized" bodies. The unitized body is a strong and rigid reinforced shell or box-like sheet-metal assemblage to which the engine, the power train, and the running gear, are attached, and this body alone is utilized to properly support and align these parts without the aid of other base or foundation members. The major difference between the unitized and conventional body resides in the floor panel and in the mode of supporting the operating elements of the vehicle. Perhaps the most difficult question presented when repairing such unitized bodies is how to anchor and subject the body to restoring force while repairs are being made, since there is no heavy frame or other structure present and which is adapted to resist the straightening forces which must be applied in various directions.

It is therefore an important object of the present invention to provide an improved clamp assemblage which is especially adapted for use in vehicle body repair work, and which has clamping jaws provided with gripping teeth capable of effectively exerting forces in different directions.

Another important object of the invention is to provide an improved gripping and holding clamp capable of positively clamping coacting sheet-metal flanges or the like together.

A further important object of this invention is to provide a dual clamping unit which can be utilized to properly support a composite article while it is being subjected to extreme pulling or other forces when being repaired or assembled.

Still another important object of the present invention is the provision of a simple but highly efficient clamping structure which can be readily applied to and removed from the work, and utilized for diverse purposes.

An additional important object of this invention is to provide a clamp assemblage having an elongated rigid support each of the opposite ends of which has a work gripping clamp thereon, and which is provided with several force applying areas whereby either both or only one of the clamps may be utilized to apply forces effectively in various directions.

These and other important objects and advantages of the invention will be apparent from the following detailed description.

A clear conception of the features constituting the present improvement, and of the construction and operation of a typical commercial clamp assemblage embodying the invention, may be had by referring to the drawings accompanying and constituting a part of this specification in which like reference characters designate the same or similar parts in the various views.

FIG. 1 is a plan view of one of the improved clamp assemblages having a pair of spaced clamps mounted upon a common support provided with several specially located mounting and force applying openings therein;

FIG. 2 is a side elevation of the same assemblage looking toward the clamps;

FIG. 3 is an end view of the assemblage looking toward the right of FIG. 1;

FIG. 4 is a perspective view showing a somewhat modified clamp assemblage embodying the invention applied to upright coacting flanges of a fragmentary sheet-metal structure which is shown in section;

FIG. 5 is another perspective view of the complete clamp assemblage of FIGS. 1 to 3 showing the same applied to horizontal coacting flanges of another fragmentary sheet-metal structure;

FIG. 6 is an enlarged plan view of one of the improved clamping plates, looking toward the gripping teeth thereof;

FIG. 7 is a similarly enlarged side view of the same clamping plate, viewed from the adjacent side of FIG. 6; and FIG. 8 is a likewise enlarged end view of the same clamping plate, viewed from the right end of FIG. 6.

While the invention has been shown and described herein as having been embodied in a clamp assemblage especially adapted for use in repairing damaged sheet-metal vehicle bodies of the unitized type, it is not intended to restrict the improved features to such usage; and it is also contemplated that specific descriptive terms appearing herein be given the broadest possible interpretation consistent with the disclosure.

Referring to the drawings, the improved clamp assemblage shown therein comprises in general, an elongated rigid support 10; a normally fixed clamping plate 11 carried by each of the opposite ends of the support 10; a movable clamping arm or plate 12 coacting with each of the fixed plates 11; a central supporting or force applying opening 13 formed in the support 10 midway between the plates 11; and another such opening 14 formed in the support 10 adjacent to and rearwardly of one of the clamping plates assemblages.

The elongated support 10 may conveniently be formed of sturdy sheet-metal as shown in FIGS. 1 to 3, or it may be in the form of a casting as in FIG. 4, and the front edge 16 of this support is preferably recessed as shown in FIGS. 1 and 5 in order to avoid interfering with the spaced end clamps. The openings 13, 14 in the support 10 may be protected and reinforced by short tubes 17 firmly secured to the body of this support as by welds 18 or otherwise, and the accurate disposition of these openings relative to the spaced end clamps is very important as will be later explained.

The specific formation of the end clamps of the assemblage is also important, and each of the clamping plates 11 is provided with a plurality of work gripping teeth 20 with which similar teeth 21 formed on the opposed clamping plates 12 are cooperable. All of the plates 11, 12 should preferably be formed of durable sheet-metal, and the clamping teeth 20, 21 in both of these plates may be accurately produced with the aid of a rotary milling cutter adapted to apply grooves such as shown in in FIGS. 6 to 8 inclusive both longitudinally and laterally entirely across each plate 11, 12 so as to produce approximately rectangular teeth 20, 21.

With this milling procedure and by utilizing a cutter of proper shape, each of the teeth 20, 21 will be rectangular and bounded by a pair of transverse intersecting and inclined surfaces extending outwardly away from adjoining sides of its base and by other surfaces disposed approximately perpendicular to the opposite adjoining sides of its base so as to provide gripping points on both jaw plates 11, 12 of each cooperating set extending in the same direction both longitudinally and laterally of the support 10 as depicted in FIGS. 2 and 3.

The elongated normally fixed clamping plates 11 are flat and may be firmly attached to the ends of the support 10 by cap screws 23. In the assemblage shown in FIGS. 1 to 3, each of the clamping arms or plates 12 is U-shaped and is provided with a pivot flange 24 coacting with the support 10 while its medial portion has a pair of threaded openings therein with which other cap screws 25 are cooperable to swing the teeth 21 toward and away from the teeth 20 of the fixed plate 11, but when the plates 11 are cast, the pivot flange may be formed integral therewith as at 24′ in FIG. 4 with the clamping plates 12 being of L-shape. In either case, the cap screws 25 pass freely through slightly enlarged openings in support 10 so as to permit the plates 12 to swing about the flange 24 without obstruction.

The teeth 20, 21 on the clamping plates 11, 12 may be directed either toward the right and rearwardly of the support 10 as viewed in FIGS. 6 to 8 inclusive, or to the left and rearwardly, depending upon the direction in which the forces are to be applied to the assemblage as indicated by the arrow in FIG. 7; and the cap screws 23, 25 will permit the plates 11, 12 to be detached and replaced by new jaw plates having gripping teeth 20, 21 of either right or left hand formation. The support 10 may also be reversed in order to permit the longitudinal forces to be applied in either direction, but these forces must be applied so as to cause the points of the teeth 20, 21 to advance in a direction away from the inclined intersecting bounding surfaces thereof.

When the improved clamping assemblage has been properly constructed as above described, the two sets of clamps at the opposite ends of the support 10 may be applied to either coacting depending flanges 27 of a sheet-metal body 28 as in FIG. 4, or to coacting horizontal flanges 29 of a body 30 as in FIG. 5, or to single or double flanges otherwise disposed, with the teeth 20, 21 firmly clamped into gripping engagement with the intervening flanges. For some types of body repair work one or both of the openings 13, 14 and the tubes 17 may be applied to pipes or beams which may be utilized either to merely carry the weight of the clamped body or to exert a pulling force upon the clamping assemblage; whereas for other classes of work a pull chain 31 may be applied to either of the openings 13, 14, as illustrated in FIG. 5.

With the provision of one force applying opening 13 located midway between the clamping jaw units, as in FIG. 5, equal pull will be applied to each of the clamps. The other force applying opening 14 located directly in back of one of the clamping units, however, causes the major force to be applied to the work transversely of the support 10 through the adjacent clamp, and if so desired the remote clamp may be released so that all of the pull will be applied through only one set of clamping jaws. Then too, the jaws nearest to the opening 14 may be released while the clamp farthest from this force applying opening is active, so that a transverse or rearward pull applied to this opening will exert a twisting effect upon the work, and by applying a pulling force to the opening 14 longitudinally of the support 10 the intervening flanges of the work will be pulled in the same direction as the applied force. The improved clamp assemblage is also susceptible of many other arrangements and uses, thus making it extremely flexible in adaptations.

From the foregoing detailed description of the construction and functioning of the device, it should be apparent that the present invention in fact provides an improved clamping assemblage having extreme utility and which is durable in structure and conveniently applicable to diverse types of work. The improved formation of the teeth 20, 21 insures positive gripping of the intervening work and tends to augment this gripping effect as the applied force is increased, and the provision of the medial and end force applying openings, enables the forces to be applied in several directions, and at several points along and transversely of the support 10 depending upon the work to be performed. The formation and location of the openings 13, 14 also permits several of the clamp assemblages coacting with remote portions of a body to be simultaneously actuated by a pipe or beam passing through such openings of the several assemblages and to which the force is applied, and the invention has gone into highly satisfactory and successful use.

Various modes of carrying out the invention are contemplated as being within the scope of the following claims particularly pointing out and distinctly claiming the subject matter which is regarded as the invention:

I claim:

1. A clamp assemblage comprising, an elongated rigid support, a work clamping unit carried by each of the opposite ends of said support, each of said units having one jaw member fixed to the support and a cooperating jaw member coacting with said support to swing toward the fixed unit, said support having therein a pair of openings for effecting the application of pulling forces to said clamps in various directions, one of said openings being located approximately midway between said units and the other being disposed closely adjacent to an end of said support.

2. An article of manufacture comprising, a clamping plate having a plurality of work engaging teeth projecting therefrom, each tooth being bounded on adjacent intersecting sides by a pair of surfaces extending approximately perpendicular to the plate and being bounded on the other adjacent intersecting sides by a pair of inclined surfaces extending outwardly away from its base and intersecting to form an offset work engaging and gripping point located laterally of the tooth axis, whereby forces applied in a direction away from the offset point are more effectively absorbed.

3. An article of manufacture comprising, a clamping plate having a plurality of work engaging teeth projecting therefrom, each tooth being bounded on adjacent intersecting sides by a pair of surfaces extending approximately perpendicular to the plate and being bounded on the other adjacent intersecting sides by a pair of transversely inclined surfaces extending outwardly away from its base and intersecting at a common offset work engaging and gripping point located adjacent the intersection of said perpendicular bounding surfaces, whereby forces applied in a direction away from the offset point are more effectively absorbed.

4. An article of manufacture comprising a clamping plate having a plurality of work engaging teeth projecting therefrom, each tooth having a rectangular base and being bounded on adjacent intersecting sides by a pair of surfaces extending from its base approximately perpendicular to the plate and being bounded on the other adjacent intersecting sides by a pair of transversely inclined plane surfaces extending outwardly away from its base and intersecting at a common apex to form an offset work engaging and gripping point located adjacent the intersection of said perpendicular bounding surfaces, whereby forces applied in a direction away from the offset point are more effectively absorbed.

5. A clamp assemblage comprising, a supporting member, and a pair of cooperating clamping plates mounted upon said member and each having a plurality of work gripping teeth projecting therefrom toward the teeth of the other plate, each of the teeth of both plates being defined by a pair of adjacent intersecting surfaces extending approximately perpendicular to the plate and by another pair of adjacent intersecting transversely inclined surfaces extending outwardly from the plate and intersecting at a common offset work engaging and gripping point located adjacent the intersection of said perpendicular surfaces, whereby forces applied in a direction away from the offset point are more effectively absorbed.

References Cited in the file of this patent

UNITED STATES PATENTS

| | | |
|---|---|---|
| 525,243 | Vare | Aug. 28, 1894 |
| 687,421 | Caldwell | Nov. 26, 1901 |
| 2,059,972 | Smith | Nov. 3, 1936 |
| 2,205,979 | Horechney | June 25, 1940 |
| 2,555,421 | Ronan | June 5, 1951 |
| 2,608,730 | Killius | Sept. 2, 1952 |
| 2,670,527 | Roper | Mar. 2, 1954 |
| 2,734,549 | Thorley | Feb. 14, 1956 |